United States Patent [19]

Blinne et al.

[11] 4,200,727

[45] Apr. 29, 1980

[54] MANUFACTURE OF POLYETHERS FROM BISPHENOLS AND DIHALIDES IN THE ABSENCE OF SOLVENT AND IN THE PRESENCE OF ALKALI METAL CARBONATE

[75] Inventors: Gerd Blinne, Bobenheim; Claus Cordes, Weisenheim, both of Fed. Rep. of Germany

[73] Assignee: BASF Aktiengesellschaft, Fed. Rep. of Germany

[21] Appl. No.: 952,800

[22] Filed: Oct. 19, 1978

[30] Foreign Application Priority Data

Nov. 5, 1977 [DE] Fed. Rep. of Germany ....... 2749645

[51] Int. Cl.² ............................................. C08G 65/40

[52] U.S. Cl. .................................... 528/125; 528/126; 528/128; 528/174; 528/219

[58] Field of Search ............... 528/125, 126, 128, 174, 528/219

[56] References Cited

U.S. PATENT DOCUMENTS 4,105,636  8/1978  Taylor .................................. 528/174

*Primary Examiner*—Lester L. Lee
*Attorney, Agent, or Firm*—Keil & Witherspoon

[57] ABSTRACT

Polyethers are manufactured by polycondensing about equivalent amounts of a bisphenol and of a dihalogen compound in the presence of an anhydrous alkali metal carbonate, in the absence of a solvent or diluent. The polyethers may be used for the manufacture of moldings, fibers, films, adhesives and coating compositions.

6 Claims, No Drawings

MANUFACTURE OF POLYETHERS FROM BISPHENOLS AND DIHALIDES IN THE ABSENCE OF SOLVENT AND IN THE PRESENCE OF ALKALI METAL CARBONATE

The present invention relates to a process for the manufacture of polyethers, especially polyethers containing sulfone groups, in the absence of a solvent.

Polymers containing sulfone groups and ether groups have been disclosed. According to Canadian Patent No. 988,245, linear polyarylene-polyethers are manufactured by reacting di-alkali metal salts of dihydric mononuclear or dinuclear phenols with an equimolar amount of a mononuclear benzene compound containing two halogen atoms and one or more electron-attracting groups in the o- or p-position, under anhydrous conditions in the liquid phase in the presence of a sulfoxide or sulfone as the solvent. According to Canadian Patent Nos. 880,398 and 847,963, polysulfone-ethers are manufactured from phenolates and aromatic dihalogen compounds in the presence of a polar high-boiling solvent and an anhydrous alkali metal carbonate, especially potassium carbonate. In the processes mentioned, the polycondensate obtained must, for further processing, in most cases be separated from the solvent and dried, thereby substantially adding to the expense of the process.

According to U.S. Pat. No. 3,634,355, polyether-sulfones are obtained by condensing an alkali metal salt of a 4-(4-halophenylsulfonyl)-phenol at above 150° C. in the absence of a diluent or solvent which would be reactive under the reaction conditions. A disadvantage of this process is that the 4-(4-halophenylsulfonyl)-phenolates can only be prepared in solution and the troublesome isolation and drying of the starting components adds to the expense of the process.

Furthermore, aqueous solutions of alkali metal hydroxide are used in preparing the alkali metal phenolate. It is necessary to adhere to precisely the stoichiometric amounts, since an excess of alkali metal hydroxide leads to hydrolysis during the formation of the polyether, with loss of halogen, and hence results in the formation of a product of undesirably low molecular weight. The molecular weight of the polyether is also reduced by free phenol, resulting from the use of too small an amount of alkali in preparing the salt of the phenol, and by the presence of water, which is formed during the preparation of the salt of the phenol, and the removal of which requires an azeotropic distillation. Furthermore, due to the water present, large agglomerates of phenolate frequently form and these can interfere substantially with the polycondensation.

It is an object of the present invention to provide a process for the manufacture of polyethers based on bis-phenols and dihalobenzene compounds, by means of which high molecular weight polyethers can be manufactured in the absence of a solvent or diluent, and without the isolation of intermediates.

We have found, surprisingly and contrary to the teaching of the prior art, that this object is achieved and that high molecular weight polyethers are obtained if substantially equivalent amounts of a bisphenol or of a mixture of several bisphenols and a dihalobenzene compound or a mixture of several dihalobenzene compounds are polycondensed in the presence of an anhydrous alkali metal carbonate and in the absence of a solvent or diluent.

The process of the invention has the advantage that it dispenses with the expensive isolation of intermediates and with the removal and regeneration of solvents and diluents.

Suitable bisphenols for the manufacture of the high molecular weight polyethers include those which have the formula

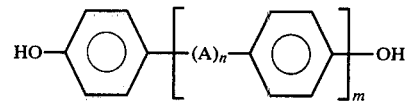

where A is a divalent radical selected from the group comprising —C(CH$_3$)$_2$—, —CO— and preferably —SO$_2$— and n and m are 0 or 1.

Examples of such bisphenols are hydroquinone, resorcinol, 4,4'-bisphenol, 2,2-bis-(4-hydroxyphenyl)-propane, bis-(4-hydroxyphenyl)-ketone and preferably bis-(4-hydroxyphenyl)-sulfone.

The above bisphenols may be employed individually or as mixtures.

Suitable dihalobenzene compounds include those of the formulae

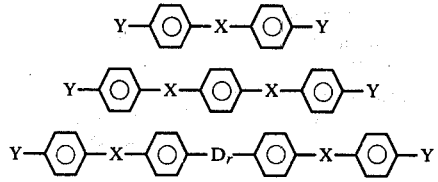

where Y is —F or preferably —Cl, X is —CO— or —SO$_2$—, D is —O— or —S— and r is 0 or 1.

Examples of such dihalobenzene compounds are bis-(4-chlorophenyl)-sulfone, bis-(4-fluorophenyl)-sulfone, bis-(4-chlorophenyl)-ketone, 1,4-bis-(4-chlorobenzoyl)-benzene, 1,4-bis-(4-chlorobenzenesulfonyl)-benzene, 4,4'-bis-(4-chlorobenzoyl)-diphenyl ether, 4,4'-bis-(4-chlorobenzoyl)-diphenyl sulfide, 4,4'-bis-(4-chlorobenzoyl)-diphenyl, 4,4'-bis-(4-chlorobenzenesulfonyl)-diphenyl ether, 4,4'-bis-(4-chlorobenzenesulfonyl)-diphenyl sulfide and 4,4'-bis-(4-chlorobenzenesulfonyl)-diphenyl. The dihalobenzene compounds can also be employed individually or as mixtures. The use of bis-(4-chlorophenyl)-sulfone and 4,4'-bis-(4-chlorobenzoyl)-diphenyl ether, and of mixtures of these, is preferred.

Examples of suitable anhydrous alkali metal carbonates are sodium carbonate and, preferably, potassium carbonate.

To carry out the process of the invention, preferably 1 mole of bisphenol is reacted with from 0.9 to 1.1 moles, preferably from 1.0 to 1.05 moles, of dihalobenzene compound and from 1.0 to 2.2 moles, preferably from 1.1 to 2.0 moles, of anhydrous potassium carbonate in the absence of a solvent, preferably in the melt, at from 200° C. to 400° C., preferably from 250° C. to 350° C., to give a polyether. If a heat-sensitive monomer is used, the upper limit of reaction temperatures is determined by the incipient decomposition of the components.

The presence of up to about 1% by weight, based on the reaction mixture, of conventional solvents or diluents is not objectionable. Preferably, however, the process is carried out in the virtually complete absence of solvent.

An embodiment of the process based on bisphenols and dihalobenzene compounds containing sulfone groups has proved particularly successful and is therefore preferred for the manufacture of the high molecular weight polyethers. Advantageously, the bisphenol is reacted with the alkali metal carbonate, in a first stage, at the stated temperatures, until the carbon dioxide and water have been completely removed, and following this the product is polycondensed with the dihalobenzene compound, in a second reaction stage, until the desired viscosity is reached. If desired, the water of reaction can be removed under reduced pressure.

However, it can also be advantageous to mix the bisphenol, the dihalobenzene compound and the alkali metal carbonate at the beginning of the polycondensation and to remove the water and carbon dioxide in a first reaction stage, at the above temperatures, if appropriate under reduced pressure, the condensation then being continued in a second reaction stage until the desired viscosity is reached. Starting components which volatilize during the first reaction stage, together with the water of reaction, are advantageously employed in appropriate excess at the start of the condensation, or replenished continuously during the second stage of the reaction. It can at times be of advantage to raise the reaction temperature, within the stated limits, as the condensation progresses. The process of manufacture according to the invention can be carried out in equipment which is made from materials inert toward the reactants and in which satisfactory contact of the reactants at the requisite high reaction temperatures is ensured, and the removal of volatile reaction products is feasible. For example, suitable equipment includes kneaders or extruders which are conventionally employed for polymers and which possess a device for the removal of volatile constituents.

The reaction mixture is polycondensed, within the stated temperature range, until the requisite degree of condensation is reached. The polycondensation time can be from 0.1 to 10 hours, preferably from 0.2 to 2 hours, depending on the nature of the starting components and on the selected reaction conditions. Suitable end groups in the polycondensates are all chemically inert groups. To introduce the end groups, a small amount of an appropriate compound is introduced into the polycondensation mixture, advatangeously after the desired degree of polycondensation has been reached. The use of aliphatic and aromatic halogen compounds, especially methyl chloride, and of the above dihalobenzene compounds, is preferred.

The inorganic constituents, for example sodium chloride or potassium chloride, can be removed, before or after isolation of the polyether, by suitable methods such as dissolving and filtering, screening or extracting.

The polyethers manufactured using the process according to the invention have reduced viscosities (measured in 1% strength solution in sulfuric acid at 23° C.) of from 0.4 to 1.5, preferably from 0.45 to 0.75. This corresponds approximately to molecular weights of from 16,000 to 120,000, preferably from 20,000 to 50,000. The polyethers produced are outstandingly suitable for the manufacture of moldings, fibers, films, adhesives and coating compositions.

The Examples and Comparative Examples which follow illustrate the invention. Parts are by weight. The reduced viscosities ($\eta_{red}$) were measured in 1% strength solution in sulfuric acid at 24° C. and calculated from the equation $$\eta_{red} = \frac{\eta_{spec}}{C}$$

EXAMPLE 1

250.3 parts of bis-(4-hydroxyphenyl)-sulfone are intimately mixed with 276.4 parts of anhydrous potassium carbonate and the mixture is kept at 300° C., under reduced pressure, until the calculated amount of water and carbon dioxide has been removed; this requires about 3 hours. Thereafter, 287.2 parts of bis-(4-chlorophenyl)-sulfone are added and the polycondensation mixture is kept at 300° C. for a further 30 minutes, with constant mixing. When a reduced viscosity of $\eta_{red}=0.50$ has been reached, a further 10 parts of bis-(4-chlorophenyl)-sulfone are added. After a further 30 minutes, the polycondensation is complete. The polymer obtained is extracted with water to remove the inorganic salts. It has a viscosity of $\eta_{red}=0.54$ and can be converted to moldings which have a high heat resistance and a good intrinsic color.

EXAMPLE 2

228.3 parts of 2,2-bis-(4-hydroxyphenyl)-propane, 287.2 parts of bis-(4-chlorophenyl)-sulfone and 165 parts of anhydrous potassium carbonate are intimately mixed and heated to 300° C., with continuous mixing. During this heating, carbon dioxide and water are continuously removed from the reaction mixture. When, after about 30 minutes, the reduced viscosity $\eta_{red}$ reaches a value of 0.55, 10 parts of bis-(4-chlorophenyl)-sulfone are added and after a further 30 minutes the polymer is isolated. After removal of the inorganic salts by treatment with hot water, the polymer has a reduced viscosity of $\eta_{red}=0.58$ and can be converted to moldings which have a high heat resistance and a good intrinsic color.

EXAMPLES 3 to 5

The procedure followed is as described in Example 1, but after the stated reaction time 10 parts of bis-(4-chlorophenyl)-sulfone are added to the reaction mixture and the polycondensation is completed in 30 minutes at the stated reaction temperature. The viscosities were determined after removing the inorganic salts by treatment with hot water.

In every case, the polymers could be converted to moldings having a high heat resistance.

The starting components used, the reaction conditions, and the viscosity and intrinsic color of the polyethers obtained are summarized in the Table which follows.

TABLE

| Example | Bisphenol (parts) | Dihalogen compound (parts) | Alkali metal carbonate (parts) | Reaction temperature (°C.) | Reaction time (mins) | $\eta_{red}$ (dl/g) | Polymer color |
|---|---|---|---|---|---|---|---|
| 4 | Resorcinol | bis-(4-chlorophenyl)-sulfone | $K_2CO_3$ | 320 | 25 | 0.46 | light |

TABLE -continued

| Example | Bisphenol (parts) | Dihalogen compound (parts) | Alkali metal carbonate (parts) | Reaction temperature (°C.) | Reaction time (mins) | $\eta_{red}$ (dl/g) | Polymer color |
|---|---|---|---|---|---|---|---|
| | (110.1) | (287.1) | (276.4) | | | | |
| 5 | Bis-(4-hydroxy-phenyl)-sulfone (250.3) | 1,4-bis-(4-chloro-benzoyl)-benzene (355.2) | " | 300 | 35 | 0.62 | light |
| 6 | Bis-(4-hydroxy-phenyl)-sulfone (250.3) | 4,4'-bis-(4-chloro-benzoyl)-diphenyl ether (447.3) | " | 320 | 42 | 0.60 | light |

We claim:

1. A process for the manufacture of a polyether by polycondensing substantially equivalent amounts of a bisphenol or of a mixture of several bisphenols and of a dihalobenzene compound or a mixture of several dihalobenzene compounds in the presence of from 1.0 to 2.2 moles of an anhydrous alkali metal carbonate, wherein the polycondensation is carried out in the melt, in the absence of a solvent or diluent at a temperature of from 200° to 400° C.

2. The process of claim 1, wherein the bisphenol used is a compound of the formula

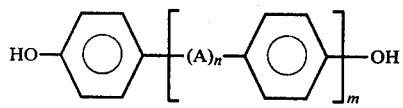

where A is a divalent radical selected from the group comprising —C(CH$_3$)$_2$—, —SO$_2$— and —CO— and n and m are 0 or 1.

3. The process of claim 1, wherein the dihalobenzene compounds is a compound of one of the formulae

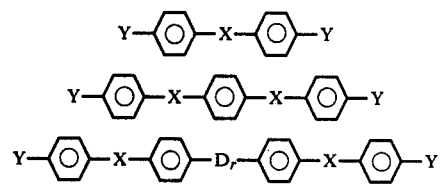

where Y is —F or —Cl, X is —CO— or —SO$_2$—, D is —O— or —S— and r is 0 or 1.

4. The process of claim 1, wherein potassium carbonate is used as the anhydrous alkali metal carbonate.

5. The process of claim 1, wherein from 1.1 to 2.0 moles of anhydrous potassium carbonate is used in the process.

6. The process of claim 5, wherein the polycondensation is carried out at a temperature of from 250° to 350° C.

* * * * *